C. W. PRADEAU.
VALVE MECHANISM FOR INTERNAL COMBUSTION ENGINES.
APPLICATION FILED FEB. 8, 1921.

1,383,998. Patented July 5, 1921.

Inventor.
C. W. Pradeau

UNITED STATES PATENT OFFICE.

CHARLES WILLIAM PRADEAU, OF LONDON, ENGLAND.

VALVE MECHANISM FOR INTERNAL-COMBUSTION ENGINES.

1,383,998.   Specification of Letters Patent.   Patented July 5, 1921.

Application filed February 8, 1921. Serial No. 443,447.

*To all whom it may concern:*

Be it known that I, CHARLES WILLIAM PRADEAU, a subject of the King of Great Britain and Ireland, residing at London, England, have invented certain new and useful Improvements in Valve Mechanism for Internal-Combustion Engines, for which I have filed application in Great Britain, Feb. 6, 1920, Patent No. 151,894; and I do hereby declare that the following is a full, clear, and exact description of the invention, such as will enable others skilled in the art to which it appertains to make and use the same.

This invention relates to valve mechanism for internal combustion engines of the class employing reciprocating valves such as piston or sleeve valves connected to a rocking member adapted to be operated from a cam.

The objects of the invention consist in an improved mechanism for operating the valves, which will be more silent in operation than the mechanism as at present constructed, and a more simplified construction, employing very few parts, which are not likely to get out of order. A further advantage of the apparatus consists in reducing the moving or rotating parts requiring lubrication to a minimum thus reducing wear. A further feature of the invention consists in an improved arrangement of the parts of the engine which enables all machining operations usually required on the cylinder or cylinder block, in the course of manufacture, to be effected in less time and with less labor than hitherto.

According to the general principle of my invention, the valves controlling the inlet and exhaust ports are each mounted at one end of a rocking or floating member adapted to be rocked directly by a cam mounted on a common shaft or if necessary on separate shafts, which shaft or shafts is or are adapted to be driven by any suitable mechanism or gearing from the engine crank shaft. The rocking members which constitute one of the principal features of the invention each consists of a fitting formed with suitable bearings to receive a cam roller adapted to be engaged by and coöperate with the cam on the cam shaft. The fitting is connected at one end to a coil spring or springs which are mounted in such a manner as to normally press the rocking member toward the operating cam. The rocking member is further mounted so that the point or fulcrum about which it rocks coincides with or approximately coincides with the center of the coils of the spring.

The opposite end of the rocking member is preferably rigidly fixed to a second spring or springs which are also connected to the valve.

In order that the invention may be readily understood reference is made to the accompanying drawings in which:—

Figure 1:
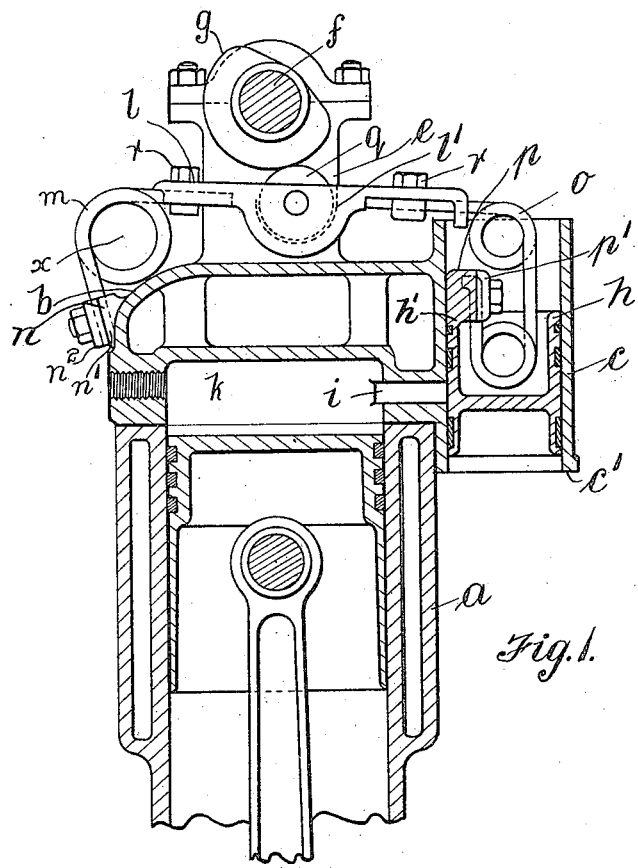
Figure 1 is a vertical section.
Figure 2:
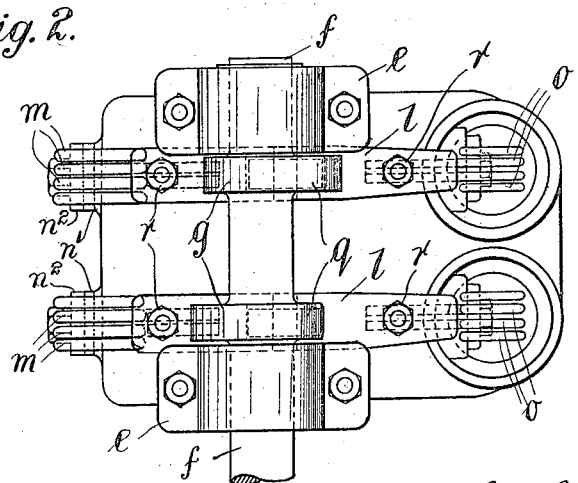
Fig. 2 is a plan view of the upper portion of the cylinder of a four stroke cycle internal combustion engine.

The cylinder $a$ is preferably provided with a removable cylinder head $b$ which is preferably formed, with inlet and exhaust valve chambers, said inlet valve chambers being indicated at $c$, and the exhaust valve chambers being not here shown. These valve chambers may be arranged on one side of the cylinder as shown in the drawing or they may be arranged on opposite sides, at the top or in any other suitable position, as desired.

The top of the cylinder head has secured thereto or formed therewith preferably two brackets or arms $e$, $e$, which form bearings for a horizontal cam shaft $f$ on which are rigidly mounted cams $g$. The cam shaft $f$ is driven by any suitable mechanism or gearing from the crank shaft (not shown) the gearing being arranged in a suitable ratio according to the type of engine to which the invention is applied.

Each of the valve chambers $c$ and $d$ carries the usual piston valve $h$, coöperating with the ports $i$, communicating with the combustion chamber $k$ in the cylinder $a$. The lower face $c^1$ of the valve chamber $c$ is connected in any suitable manner to a source of supply of explosive mixture while the corresponding lower surface of the exhaust valve chamber which is not seen in the drawing, is connected to the usual exhaust.

Mounted above the cylinder head $b$ is a pair of rocking members each comprising a fitting $l$ to one end of which is rigidly connected one end of a coil spring or springs $m$, the opposite ends of which are adapted to be secured to a bracket $n$ on the side of the cylinder head. In the drawings, I have shown two coiled springs arranged side by side, but it will be readily understood that these springs may be replaced by a single spring or by a plurality of springs. The bracket $n$ for securing the outer ends of the springs m preferably consists of a flat projecting portion $n^1$ formed with vertically disposed V grooves or semi-circular channels or slots, which coöperate with a plate or the like $n^2$ similarly slotted or channeled. The ends of the springs are adapted to engage in the slots and when the plate $n^2$ is bolted in position, the springs will be securely gripped.

The opposite end of the fitting $l$ is connected in a similar manner to one end of a pair of springs $o$ (which may also be replaced by a single spring or a plurality of springs) the opposite ends of which are gripped between a pair of plates $p$, $p^1$ bolted together, one of said plates $p$ being formed with or attached to the top of the piston valves $h$ at $h^1$.

Each of the fittings $l$ is provided with a recess or aperture $l^1$ in which is pivotally mounted a cam roller, $q$, said cam roller being adapted to coöperate with the cams $g$. The ends of the fitting are preferably slotted while the inner ends of the springs are adapted to engage said slots, the ends of the fitting being forced together to grip the ends of the springs by bolts $r$.

It will be understood that the cams $g$ are mounted relatively to one another, so as to cause the rocking member to be rocked to place the respective valve chambers into communication with the cylinders at appropriate times.

The operation is as follows:—

The cam rollers $q$ are normally pressed into contact with the cams $g$ by the springs $m$, and as the cam rotates the rocking member will be rocked about a point which approximately coincides with the center $x$ of the spring $m$, thus alternately raising and lowering the piston valves. When the rocking member moves upwardly the coil springs $m$ have a tendency to open out or extend whereby the fitting will be moved to the left to a very small extent, while the spring $o$ connected to the opposite end of the fitting $l$ and the corresponding piston valve has a tendency to close, or its ends to move toward one another, so that the lateral movement of the fitting is thereby taken up. By this means very silent and quickly operating movement is obtained, while at the same time the number of parts employed is considerably reduced. Further the only parts requiring lubrication are the piston valves and the cam rollers $q$ so that the tendency to wear or to get out of order is reduced to a minimum.

It will be readily understood that the details of construction may be modified considerably, without departing from the principle of the invention. For instance the valves may be arranged in any other position and move in any other direction than that shown. Further the cam shaft $f$, may if necessary, be arranged below the rocking members in which case the springs $m$ and $o$ would be arranged to exert pressure in the opposite sense as will be readily understood.

What I claim as my invention and desire to secure by Letters Patent of the United States of America is:—

1. In combination with a cylinder and a valve of an internal combustion engine, a floating member, a spring connecting the said member to the cylinder, a second spring connecting the said member to the valve, the first named spring serving to move the floating member and the valve in one direction, and positively driven means to move said floating member and said valve in the reverse direction.

2. In combination with a cylinder and a valve of an internal combustion engine, a floating member, a spring connecting the said member to the cylinder, a second spring connecting the said member to the valve, the first named spring serving to move the floating member and the valve in one direction, and a positively driven cam to move said floating member and said valve in the reverse direction.

3. In combination with a cylinder and a valve of an internal combustion engine, a floating member, a spring connecting said floating member to the cylinder, said spring including a coil at a point intermediate its ends serving to form a fulcrum for said floating member and to also move said floating member in one direction, a second spring connecting said floating member to the piston, and positively driven means to move said floating member in the reverse direction.

4. In combination with a cylinder and a valve of an internal combustion engine, a floating member, a roller carried by said floating member, a spring to move said floating member in one direction, said spring also connecting said floating member to the cylinder, a second spring connecting the floating member to the valve, and a revoluble cam coacting with said roller to move the floating member in the reverse direction.

CHARLES WILLIAM PRADEAU.